United States Patent
Walter

(10) Patent No.: US 6,608,401 B1
(45) Date of Patent: Aug. 19, 2003

(54) ALTERNATOR/INVERTER WITH DUAL H-BRIDGE

(75) Inventor: Richard Thomas Walter, Baldwin, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/077,219

(22) Filed: Feb. 15, 2002

(51) Int. Cl.[7] .............................. H02H 3/20; H02P 9/44

(52) U.S. Cl. ......................... 307/39; 307/18; 363/142; 322/25; 322/28

(58) Field of Search .................... 363/71, 142, 143; 307/18, 19, 20, 21, 24, 28, 29, 38, 39, 64, 66; 322/17, 22, 24, 25, 28

(56) References Cited

U.S. PATENT DOCUMENTS

| | | |
|---|---|---|
| 3,668,514 A | 6/1972 | Peck |
| 3,900,787 A | 8/1975 | Koster |
| 4,973,896 A | 11/1990 | Shiga et al. |
| 5,162,984 A | 11/1992 | Castagnet et al. |
| 5,200,887 A | 4/1993 | Ioroi et al. |
| 5,260,864 A | 11/1993 | Simonelli et al. |
| 5,332,927 A * | 7/1994 | Paul et al. ................... 307/66 |
| 5,373,196 A | 12/1994 | Faley |
| 5,446,641 A | 8/1995 | Reynolds et al. |
| 5,719,485 A | 2/1998 | Asada |
| 5,862,041 A | 1/1999 | Martin |
| 5,936,828 A | 8/1999 | Nolan et al. |
| 6,037,740 A | 3/2000 | Pollock et al. |
| 6,111,768 A | 8/2000 | Curtiss |
| 6,140,729 A | 10/2000 | Pollock et al. |
| 6,144,190 A | 11/2000 | Scott et al. |

FOREIGN PATENT DOCUMENTS

| | | |
|---|---|---|
| DE | 41 12 907 C1 | 4/1992 |
| DE | 38 40 806 C2 | 6/1992 |
| DE | 195 18 479 A1 | 11/1996 |
| DE | 197 04 122 A1 | 8/1998 |
| DE | 199 42 203 A1 | 3/2001 |
| DE | 199 52 886 A1 | 5/2001 |
| EP | 0 292 512 B1 | 7/1992 |
| EP | 0 511 344 B1 | 4/1996 |
| JP | 2934675 | 9/1991 |
| JP | 4-45402 | 10/1992 |
| JP | 2000-209872 | 7/2000 |
| JP | 2000-217397 | 8/2000 |
| JP | 2000-217398 | 8/2000 |
| WO | WO 97/01212 | 1/1997 |
| WO | WO 98/05112 | 2/1998 |

* cited by examiner

*Primary Examiner*—Jessica Han
(74) *Attorney, Agent, or Firm*—Harness, Dickey & Pierce, P.L.C.

(57) ABSTRACT

An alternator/inverter system for use with a portable generator which includes a voltage regulation system. The alternator/inverter incorporates a pair of permanent magnet generators (PMGs), a pair of active rectifier circuits, a pair of DC bus capacitors and a pair of H-bridge inverters, forming two distinct alternator/inverter sections. Each alternator/inverter section provides a 120 VAC output, and a 240 VAC output is formed between the two alternator/inverters sections. The voltage regulation system is formed from a pair of voltage regulation circuits that are associated with each alternator/inverter section. The circuits monitor the DC bus voltage of each alternator/inverter and determine the DC losses resulting from electrical cabling coupling the alternator/inverters to external loads, as well as the H-bridge inverters. A microcomputer or an analog device(s) controls the rectifiers of each to perform "V+IR" compensation based on the sensed DC bus voltage of each alternator/inverter section.

22 Claims, 4 Drawing Sheets

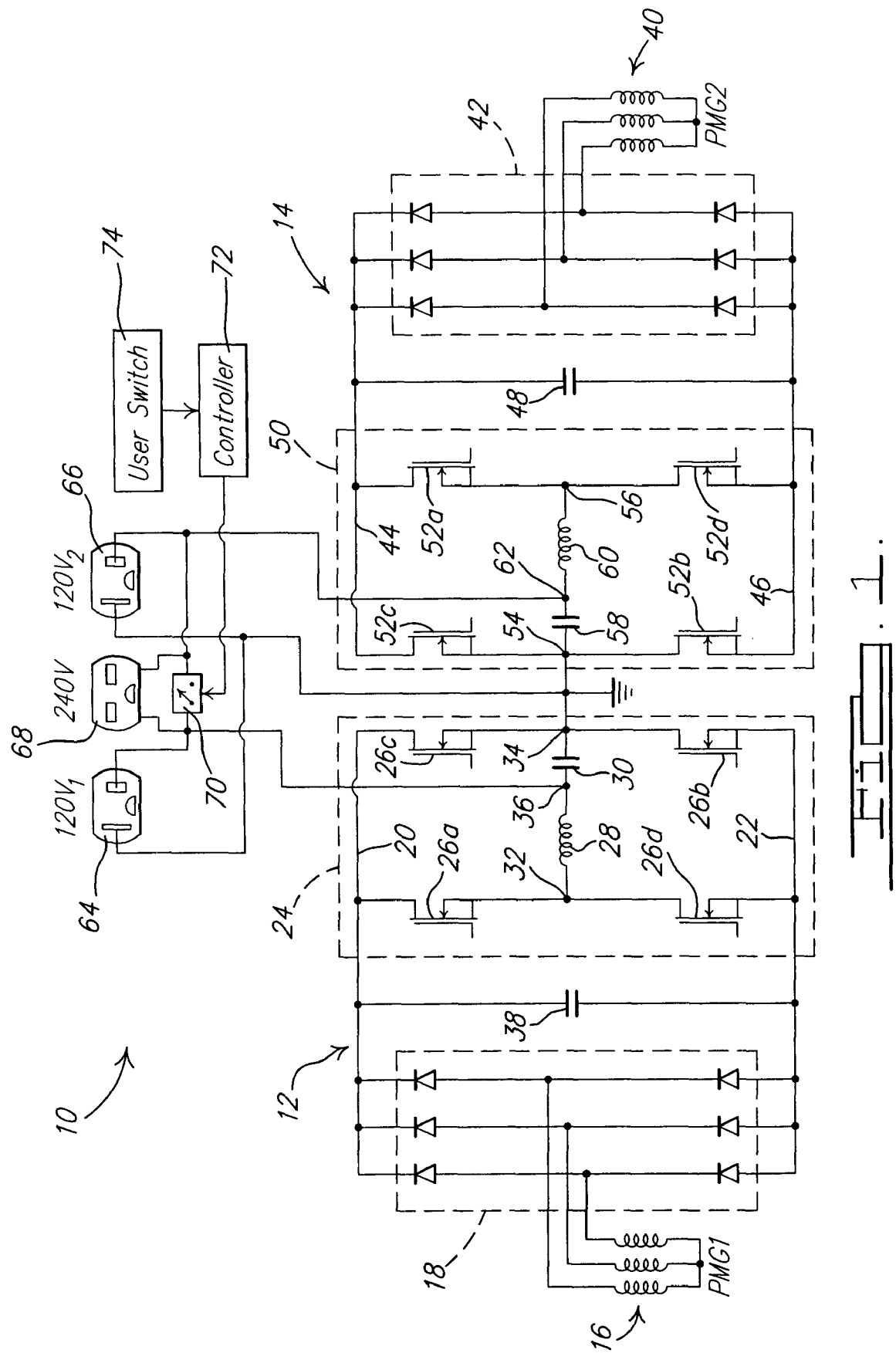

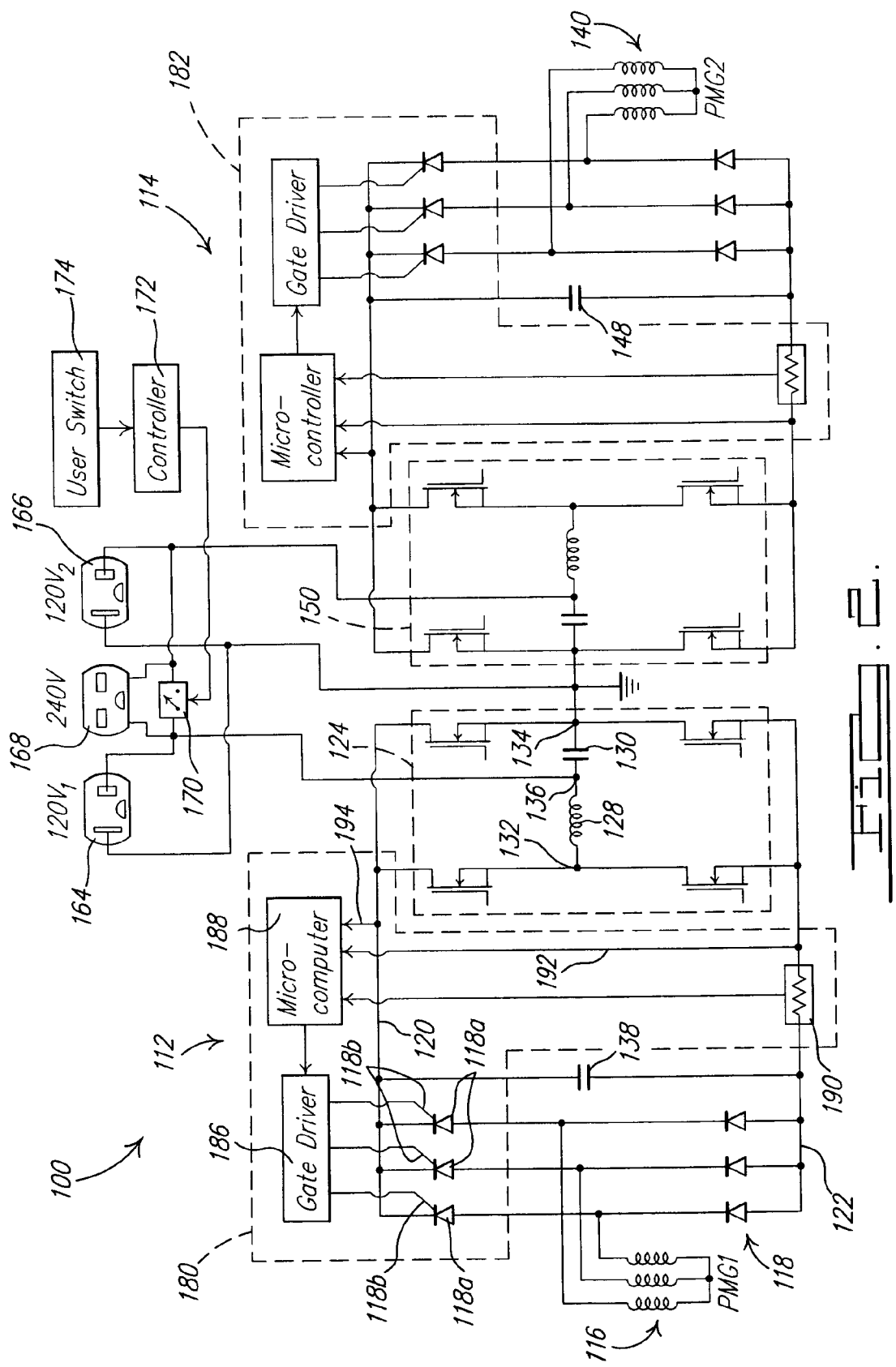

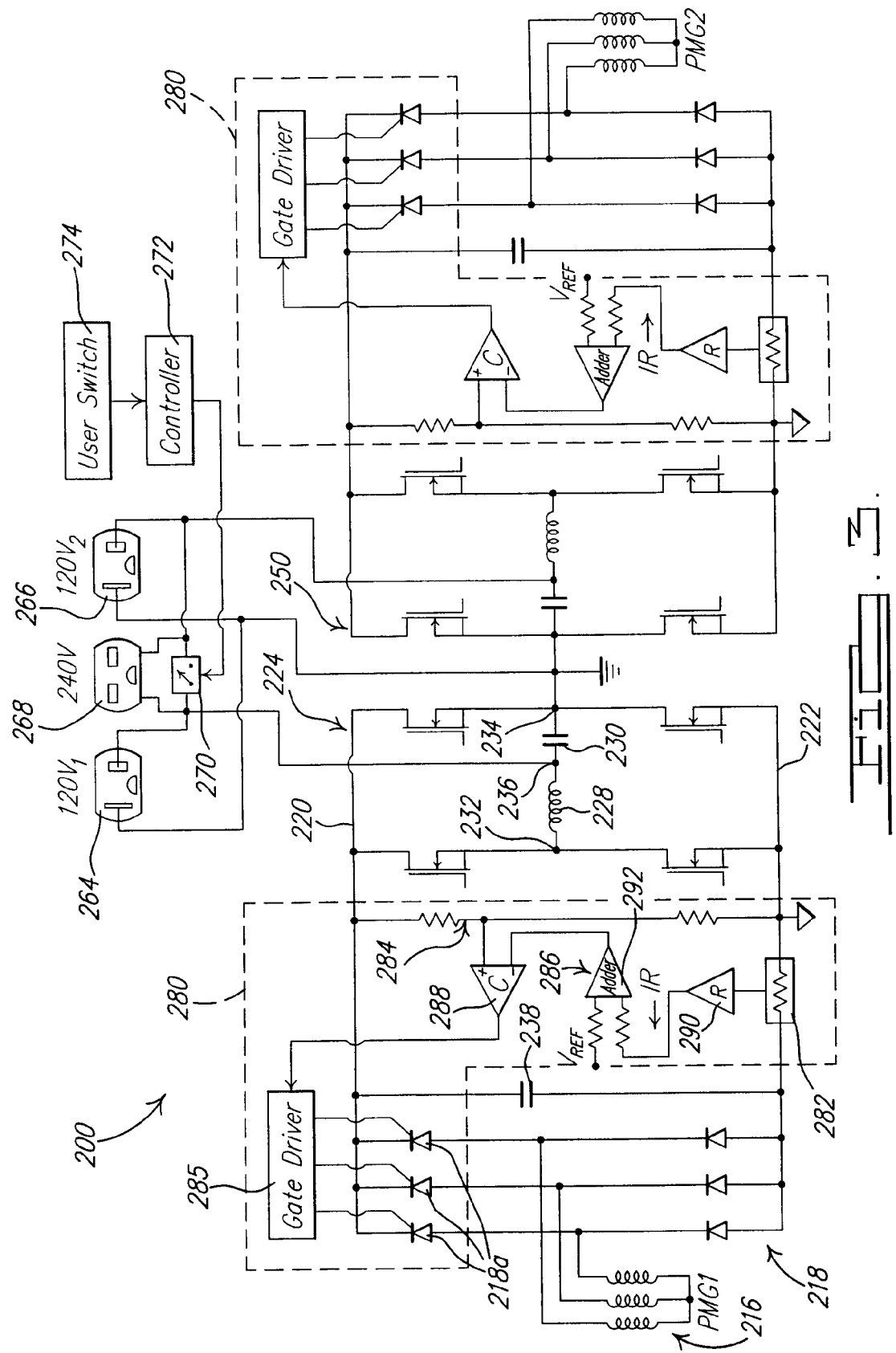

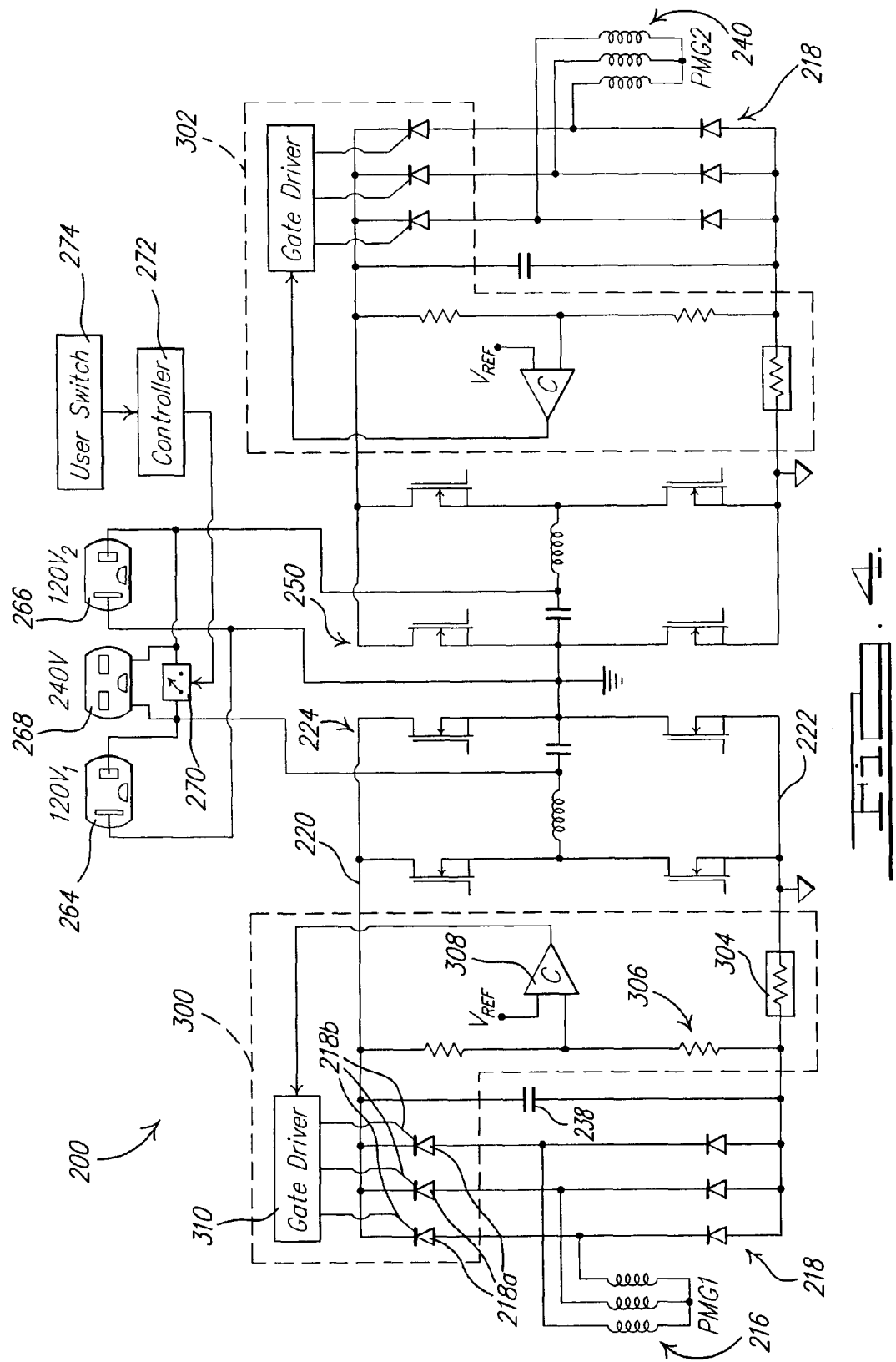

ALTERNATOR/INVERTER WITH DUAL H-BRIDGE

FIELD OF THE INVENTION

This invention relates to power generating systems such as alternators and power generators, and more particularly to an alternator/inverter having a dual H-bridge for providing 120 volt AC or 240 volt AC power.

BACKGROUND OF THE INVENTION

Present day portable generators typically make use of a synchronous alternator or a cycloconverter for providing the desired power output, which is typically either 120 volts AC or 240 volts AC. Important considerations for any portable generator are:

Voltage regulation;
Dual voltage output capability;
Idle voltage and frequency;
Frequency tolerance;
Harmonic distortion:
  Induction motor operation
  Charger operation
Grounding configuration;
4-blade (120–240 volt) twist-lock compatibility;
Response to load changes; and
Size and weight.

With regard to idle voltage and frequency, it is far easier to provide 120 volts and 60 Hz at idle using electronic solutions (i.e., inverter technology) than it is with synchronous alternators. However, sufficient "head room" is still required. To provide 120 volts at 2100 rpm requires a DC bus voltage of 298 volts versus the 225 volts estimated for regulation head room. This higher voltage requires more turns in the alternator coils resulting in an increased coil resistance and reduced system efficiency.

Harmonic distortion present in the output waveform of a portable generator is another important consideration that must be addressed. While waveform purity is of little importance to universal motor-powered portable power tools, it is an important consideration when running induction motors and chargers. Induction motors will run on distorted waveforms, but the harmonic content of the input will be converted to heat, not torque. The extra heating from the harmonics must be quantified if a inverter topology which produces a distorted waveform is to be implemented. A sine wave pulse width modulated (PWM) inverter will produce excellent waveforms with only some high frequency noise, but they are likely to require full H-bridges which, traditionally, have not been easily adaptable to the North American grounding convention and the 4-blade twist-lock wiring convention.

With regard to grounding configurations, in North America, the standard grounding convention requires that one side (neutral) of each 120 volt circuit is grounded. This means that 240 volt circuits have floating grounds. It is difficult to achieve this standard grounding convention with sine wave PWM inverters that require full H-bridges. It is possible to meet this convention through the use of two half bridges, but such a circuit may be limited to quasi-sine wave outputs which have high harmonic content.

Still another important consideration is 4-blade (120–240 volt) twist lock compatibility. This convention requires four wires: ground, neutral, 120 volt line 1 and 120 volt line 2. Each 120 volt circuit is connected between a 120 volt line and neutral. The 240 volt circuit is connected between the 120 volt line 1 and the 120 volt line 2. Heretofore, it has been possible to fit the convention with a dual half bridge circuit, but not a full H-bridge circuit that would be required for sine wave PWM inverters.

The ability of a generator to respond to load changes is still another important consideration. All inverter topologies will provide a faster response to load changes than a synchronous alternator, due to the large field inductance used by a synchronous alternator.

Concerning size and weight, it would also be desirable to make use of inverter topology because virtually any inverter topology will provide size and weight benefits over that of a synchronous alternator. However, trying to produce sine waves from a two half bridge circuit may require large capacitors that would reduce the benefit of volume reduction provided by the inverter topology.

In view of the foregoing, it is a principal object of the present invention to provide a generator which meets the grounding convention used in North America through the use of inverter technology. It is still a further object of the present invention to provide a generator using inverter technology which can provide either 120 volt or 240 volt outputs and still meet the grounding convention used in North America.

Still further, it is an object of the present invention to provide a generator using inverter topology which meets the 4-blade twist-lock compatibility requirements.

SUMMARY OF THE INVENTION

The above and other objects are provided by an alternator/inverter system having dual alternator/inverter sections, with each section including a full H-bridge inverter circuit. Each alternator/inverter section incorporates an independent permanent magnet generator winding which is coupled to an independent full wave bridge rectifier circuit. Each rectifier circuit provides a DC voltage to its associated full H-bridge circuit. The first H-bridge circuit includes a first output point and a second output point while the second H-bridge circuit includes a third output point and a fourth output point. The second and third output points are coupled together as a neutral node and connected to ground. A first AC receptacle is coupled across the first output point and neutral. A second AC receptacle is also coupled across neutral and the fourth output point. A third AC receptacle is coupled across the first and fourth output points. Coupled across the third AC receptacle is an electronically controlled switch for selectively shorting the third AC receptacle. The switch is controlled by an electronic controller which also controls operation of each of the H-bridge circuits. A user switch allows a user to select a first mode of operation wherein full power developed by the alternator/inverter system may be drawn from either of the first or second AC receptacles, or a second mode of operation in which the third AC receptacle is operable. In one preferred embodiment, each of the first and second AC receptacles provide 120 volts AC, and the third AC receptacle provides 240 volts AC. In the second mode of operation, only half the total ampere generating capacity of the system is available at either of the first and second 120 AC receptacles as compared to that which would be available if the alternator/inverter system was operating in the first mode of operation. Importantly, the present invention adheres to the grounding convention used in North America in which one leg of each of the first and second AC receptacles is tied to ground.

The alternator/inverter of the present invention further provides excellent control over the harmonic distortion of the output waveform. The use of inverters allows a faster response to load changes than what would be obtainable with a synchronous alternator.

In alternative preferred embodiments, both analog and digital voltage regulation circuits are incorporated into the alternator/inverter system of the present invention. The voltage regulation circuits are employed together with active rectifiers to control the DC bus voltage across each inverter between predetermined upper and lower limits. In this manner, losses associated with electrical cabling coupled to the outputs of the two inverters, as well as losses associated with the inverters themselves, can be compensated for.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a simplified schematic diagram of an inverter/alternator with dual H-bridges for providing 120 volt or 240 volt operation, in accordance with a preferred embodiment of the present invention; and FIG. 2 is a simplified schematic drawing of an alternative preferred embodiment of the present invention incorporating a digital DC voltage regulation system for compensating for the DC bus voltage drop caused by a power cabling coupled to the alternator/inverter;

FIG. 3 is a simplified schematic drawing of another alternative preferred form of the voltage regulation circuit, which involves the use of an analog comparator; and FIG. 4 is still another alternative preferred embodiment of the voltage regulator circuit used with the alternator/inverter system of the present invention.

DETAILED DESCRIPTION OF THE PREFERRED EMBODIMENTS

The following description of the preferred embodiment(s) is merely exemplary in nature and is in no way intended to limit the invention, its application, or uses.

Referring to FIG. 1, there is shown an alternator/inverter system 10 in accordance with a preferred embodiment of the present invention. The system 10 is ideally suited for use in a portable electric power generator, however, it will be appreciated that the invention is not so limited and may find utility in a variety of related power generating applications.

The system 10 includes two identical alternator/inverter sections or subsystems 12 and 14. Alternator/inverter section 12 includes a three phase permanent magnet generator (PMG) 16 for providing a three phase AC output signal to a full wave bridge rectifier circuit 18. Rectifier circuit 18 is coupled across DC bus lines 20 and 22 which form a DC bus. Coupled across the DC bus is a first, full H-bridge circuit 24 comprised of four identical power switching devices 26a–26b. An inductor 28 and a capacitor 30 are coupled across points 32 and 34 and form an LC filter for attenuating harmonic distortion in the output waveforms generated by the H-bridge 24. Point 36 forms a first output and point 34 forms a second output. Each of the power switching devices 26a–26d may comprise a variety of suitable power switching components, but in one preferred form comprise insulated gate bi-polar transistors (IGBTs). A DC bus capacitor 38 is also coupled across the DC bus.

The second alternator/inverter section 14 is identical in construction to the first alternator/inverter section 12 and includes a three phase permanent magnet generator 40 providing an AC output to a full wave bridge rectifier circuit 42. Bridge rectifier circuit 42 is coupled across DC bus lines 44 and 46 and across DC bus capacitor 48. The DC output from the rectifier 42 drives a second, full H-bridge circuit 50 having four power switching devices, which in this example are illustrated as IGBTs 52a–52d. Coupled between points 54 and 56 are a capacitor 58 and an inductor 60 which form an LC filter for attenuating harmonic distortion in the output waveforms produced by the H-bridge 50. Point 54 forms a third output point and point 62 forms a fourth output point.

A first AC power receptacle, in this example a 120 volt AC receptacle 64, is coupled across first output point 36 and the second output point 34 by the connection to ground. A second AC power receptacle, illustrated as a 120 volt AC receptacle 66, is similarly coupled between the fourth output point 62 and the third output point 54, via the connection to ground. Coupled across output points 36 and 62 is a third AC receptacle, which in this example is illustrated as a 240 volt AC receptacle 68. 240 volt AC receptacle 68 also has coupled in parallel with it a power relay 70 which is controlled by a controller 72. The controller 72 operates to switch the contacts of the power relay 70 between an open condition, wherein the 240 volt AC receptacle 68 receives the output across points 36 and 62, and a closed position in which the receptacle 68 is shorted by the power relay 70. A user switch 74 allows a user to provide a signal to the controller 72 to select whether the 240 volt AC receptacle 68 is switched "ON" for use or not. The controller 72 also provides pulse width modulated (PWM) control signals to each of the H-bridges 24 and 50 to control switching of the IGBTs 26 and 52 to produce the desired AC output waveforms across points 34, 36 and 54, 62.

In operation, a DC bus voltage of preferably around 200–220 volts is provided across the DC bus lines 20, 22 and 44, 46. The controller 72 controls the first H-bridge 24 such that IGBTs 26a and 26b are switched on while IGBTs 26c and 26d are off. IGBTs 26a and 26b are then turned off while IGBTs 26c and 26d are turned on. The second H-bridge 50 is controlled in the same fashion by first turning on IGBTs 52a and 52b while IGBTs 52c and 52d are turned off, and then turning on IGBTs 52c, 52d while IGBTs 52a and 52b are turned off. The controller 72 switches the H-bridges 24 and 50 on and off using a well known sine wave PWM pattern that produces a constant frequency sine wave output. In the present embodiment, this provides 120 volts AC across capacitor 30 and 120 volts AC across capacitor 58.

When the power relay 70 is in the closed position, the first AC receptacle 64 and the second AC receptacle 66 are coupled in parallel. Thus, each AC receptacle 64 and 66 is able to receive the full ampere output from the system 10. By that it is meant that the full ampere generating capacity of the system 10 is available to either AC receptacle 64 or 66. If both AC receptacles 64 and 66 are used, then the full current generating capacity of the system 10 will be split between the AC receptacles 64 and 66 according to the loads imposed by the devices coupled to the AC receptacles 64 and 66. The 240 volt AC receptacle 68 is shorted and inoperable when the power relay 70 is closed.

When a 240 volt AC load is to be driven by the system 10, the user selects switch 74, which in turn sends a signal to the controller 72 to open the switch contacts of the power relay 70. In this condition (shown in FIG. 1), the 240 volt AC receptacle 68 is then effectively placed across output points 36 and 62. The controller 72 also controls the second H-bridge 50 such that the 120 volt AC output across capacitor 58 is 180° out of phase with the 120 volt AC output across capacitor 30. Thus, a 240 volt potential difference exists between output points 36 and 62. It will be appreciated, however, that the first H-bridge 24 could also be controlled by the controller 72 such that its output is changed in phase by 180° instead of the output of the second H-bridge 50. When the 240 volt AC receptacle 68 is operable, only one half of the total ampere generating capacity of the system 10 will be available to each of the first AC receptacle 64 and the second AC receptacle 66.

Importantly, the system 10 adheres to the wiring convention used in North America which provides for one leg of each 120 VAC receptacle 64 and 66 to be tied to ground. The system 10 also provides 4-blade (120–240 volt) twist-lock compatibility. The use of inverters provides a faster response to load changes than would otherwise be possible with a conventional synchronous alternator with its typically large field inductance. The use of inverter technology also allows the system 10 to be made smaller and lighter than what would be possible with a conventional synchronous alternator.

Referring now to FIG. 2, an alternator/inverter 100 in accordance with an alternative preferred embodiment of the present invention is shown. The alternator/inverter 100 is identical in construction to the alternator/inverter 10 with the exception of a pair of voltage regulation circuits 180 and 182. For convenience, the components of system 100 identical to those of system 10 have been labeled with reference numerals increased by 100 over those used in connection with system 10. The overall operation of the two alternator/inverter circuits 112 and 114 is identical to that provided in connection with the description of operation of system 10, and will therefore not be repeated. Furthermore, since the components of each of the voltage regulation circuits 180 and 182 are identical in construction and operation, only the construction and operation of circuit 180 will be described.

It will be appreciated that good voltage regulation is an important attribute of any electric power generation system. Since the user will generally be using power at the end of an extension cord, it is desirable to compensate for the voltage drop in the electrical power cable. This can be done by monitoring the AC output voltage and current in the inverters 124 and 150, but measuring DC currents and voltages is easier and can be done faster. Thus, the voltage regulation circuits 180 and 182 operate to control the DC bus voltage of each alternator/inverter section 112 and 114 independently and compensate for not only the voltage drop of the extension cord, but the drops caused by the inverters 124 and 150 as well.

Referring further to FIG. 2, a plurality of three silicon controlled rectifiers (SCRs) 118a are substituted for three of the conventional diodes used with rectifier 18 of system 10. Each of the SCRs 118a has its gate 118b coupled to an output of a gate driver circuit 186. The gate driver circuit 186 receives an output from a microcomputer 188, which in turn receives a signal from a conventional current sensing circuit (i.e., shunt) 190 and a differential DC voltage signal representing the potential difference between the two DC bus lines 120 and 122. The microcomputer 188 preferably comprises an 8-bit microcontroller such as the MC68HC08MR4 available from Motorola, but it will be appreciated that a variety of other suitable controllers could be implemented as well.

In operation, the current sensing circuit 190 senses a change in the DC current flowing in DC bus line 122 and provides an output indicative of same to the microcomputer 178. Simultaneously, the microcomputer 188 measures a differential voltage between bus lines 120 and 122 via circuit lines 192 and 194. The microcomputer 188 includes an internal look-up table for providing a "$V_{ref}$" value needed to adjust the DC output voltage of the system 100. The $V_{ref}$ vs. DC current look-up table is constructed using an assumed value of internal resistance (H-bridge and AC filter) and an assumed value of extension cord resistance. An exemplary table, as shown below, increases the $V_{ref}$ (and, therefore the DC bus voltage) such that the output voltage of the system 100 increases linearly with increased current until the output voltage reaches 126 volt (a limit set by regulatory agencies). At this point, the slope of the DC bus voltage vs. current curve changes so as to maintain the 126 volts at the output terminals of the H-bridge 124. The voltage at the end of the cable will equal the output voltage minus the IR drop of the particular cable used.

| Vref vs. DC Current Look-up Table | | | |
|---|---|---|---|
| $I_{load}$ | $V_{bus}$ (DC) | $V_{out}$ (RMS) | $V_{cable\ end}$ (RMS) |
| 0 | 169.7 | 120.0 | 120.0 |
| 2 | 173.4 | 120.6 | 120.0 |
| 4 | 177.1 | 121.3 | 120.0 |
| 6 | 180.9 | 121.9 | 120.0 |
| 8 | 184.6 | 122.5 | 120.0 |
| 10 | 188.3 | 123.2 | 120.0 |
| 12 | 192.0 | 123.8 | 120.0 |
| 14 | 195.8 | 124.4 | 120.0 |
| 16 | 199.5 | 125.1 | 120.0 |
| 18 | 203.2 | 125.7 | 120.0 |
| 20 | 206.4 | 126.0 | 119.7 |
| 22 | 209.3 | 126.0 | 119.0 |
| 24 | 212.1 | 126.0 | 118.4 |
| 26 | 214.9 | 126.0 | 117.7 |
| 28 | 217.8 | 126.0 | 117.1 |
| 30 | 220.6 | 126.0 | 116.5 |
| 32 | 223.4 | 126.0 | 115.8 |
| 34 | 226.2 | 126.0 | 115.2 |
| 36 | 229.1 | 126.0 | 114.6 |
| 38 | 231.9 | 126.0 | 113.9 |
| 40 | 234.7 | 126.0 | 113.3 |

The output of the current sensing circuit 190 "I" is a measure of the "IR" drop due to the resistance of the cables coupled to the outlets 164, 166 orf 168, and the voltage drop due to the losses associated with the inverter 112 and the output filter formed by inductor 128 and capacitor 130. The microcomputer 188 uses the measured DC current "I" to obtain the current value for $V_{ref}$ from its internal look-up table. The microcomputer also measures the DC bus voltage, "$V_{bus}$" between the two DC bus lines 120 and 122. When the microcomputer 188 detects that the DC bus voltage, "$V_{bus}$", is lower than the current value of $V_{ref}$, then it signals the gate driver circuit 186 to turn on the SCRs 1118a, thus charging the DC bus capacitor 138. The rectifier 118 functions as a normal six diode bridge when the SCRs are on. When the microcomputer 188 detects that the DC bus voltage exceeds the present value for $V_{ref}$, then it signals the gate driver circuit 186 to turn off the SCRs 118a. In this manner, the microcomputer 188 continuously monitors and adjusts the DC bus voltage to compensate for the above-described losses. The PWM duty cycle of the signal used to control H-bridge 124 is not changed during the process of adjusting the SCRs 118a to compensate for changes in the DC bus voltage.

Referring to FIG. 3, another alternative preferred embodiment 200 of the present invention is shown. Embodiment 200 is also identical in construction and operation to the system 100 of FIG. 2 with the exception of the use of a pair of analog voltage regulation systems 280. Again, the components in common with the system 10 are designated by reference numerals increased by 200 over those used in connection with FIG. 1.

The voltage regulation system 280 comprises a current shunt 282, a voltage divider network 284, a gate driver circuit 285, and a "V+IR" compensation circuit 286. The current shunt 282 is inserted into the lower DC bus rail 222 to measure DC current ("I"). The voltage across the lower resistor of the divider network 284 is a fraction of the DC bus voltage. The center node of the divider network is connected to the inverting input of a comparator 288 of the compensation circuit 286. The current signal from the left side of the shunt 282 will be negative with respect to the signal ground when the bus capacitor 238 is supplying power to the H-bridge 224. Therefore, the current signal is inverted and amplified via an inverting amplifier 290 of the compensation circuit 286, with a gain of "R". The "IR" signal is added to a fixed voltage reference "$V_{ref}$". The output of an adder 292 of the compensation circuit 286 ($V_{ref}$+IR) is fed to the non-inverting input of the comparator 288. When the DC bus voltage (Vbus) across the DC bus capacitor 238 exceeds the value of "$V_{ref}$ +IR", the comparator 288 sends a low signal to the gate driver circuit 285 which turns off all the SCRs 218a. When the DC bus voltage is lower than the value of "$V_{ref}$+IR", then the comparator 288 sends a high signal to the gate driver circuit 285'which turns on all of the SCRs 218a. The 3-phase bridge rectifier circuit 218 then recharges the DC bus capacitor 238.

Referring to FIG. 4, the system 200 is shown with simplified voltage regulation circuits 300 and 302 incorporated. Since the circuits 300 and 302 are identical in construction and operation, only circuit 300 will be described. Circuit 300 represents an even less complicated means for implementing the "V+IR"control described above. Circuit 300 includes a current shunt 304 which is inserted into the bottom rail 222 of the DC bus to measure current ("I"). A resistor divider network 306 is again coupled across the DC bus lines 220 and 222, but now it is located to the left of the current shunt 304. The signal ground on the bottom DC bus rail 222 is still to the right of the current shunt 304. The center node of the divider 306 is still connected to an inverting input of a comparator 308.

The "I" signal from the left side of the shunt 304 still will be negative with respect to the signal ground when the DC bus capacitor 238 is supplying power to the H-Bridge 224. The "IR" drop of the current shunt 304 will be negative with respect to the DC voltage (Vbus') at the center node of the divider 306. Therefore, the signal to the inverting input of the comparator 308 will be "Vbus'−IR". The non-inverting input of the comparator 308 is connected to the reference voltage ("$V_{ref}$"). When "Vbus'−IR" is greater than $V_{ref}$, the comparator 308 sends a low signal to a gate driver circuit 310 which turns off all the SCRs 218a. When "Vbus'−IR" is less than $V_{ref}$, the comparator 308 sends a high signal to the gate driver circuit 310 which turns on all the SCRs 218a. However, "Vbus '−IR">than $V_{ref}$ is equivalent to Vbus'>$V_{ref}$ +IR, and Vbus'−IR <$V_{ref}$ is equivalent to Vbus'<$V_{ref}$+IR. Thus, the same function is achieved with fewer parts.

The voltage regulation circuits 180, 280 and 300 thus provide a means for controlling the DC bus voltage of each of the inverters of the present invention to thereby compensate for losses associated with electrical cabling coupled to the AC receptacles, as well as internal losses of each of the inverters.

The various preferred embodiments of the present invention also provide for an alternator/inverter system which meets the grounding convention used in North America, as well as providing compatibility with the 4-blade twist lock wiring convention. The inverters of the present invention provide excellent control over total harmonic distortion of the output waveforms produced, and are able to respond faster to load changes than conventional synchronous alternators.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An alternator/inverter apparatus, comprising:
   a first poly-phase generator;
   a first inverter responsive to an output of said first poly-phase generator for providing a first AC output;
   a second poly-phase generator;
   a second inverter responsive to an output of said second poly-phase generator for providing a second AC output;
   a third AC output formed between portions of said first and second inverters; and
   a controller for controlling said inverters to provide a first voltage output at each of said first and second AC outputs and a second voltage output at said third AC output.

2. The apparatus of claim 1, further comprising an electronically controlled switch controlled by said controller for selectively enabling and disabling said third AC output.

3. The apparatus of claim 2, further comprising a user actuated switch for providing a signal to said controller to enable or disable said third AC output.

4. The apparatus of claim 1, wherein said controller controls said inverters such that one of said first voltage outputs is 180 degrees out of phase with each other, to thereby cause said second voltage output to be twice that of said first voltage output.

5. A synchronous alternator/inverter apparatus, comprising:
   a first three phase generator;
   a first inverter responsive to an output of said first three phase generator for providing a first AC output;
   a second three phase generator;
   a second inverter responsive to an output of said second three phase generator for providing a second AC output;
   a third AC output formed between portions of said first and second inverters;
   an electronically controlled switch coupled across said third AC output for selectively enabling and disabling said third AC output;
   a controller for controlling said inverters to provide a first voltage output at each of said first and second AC outputs and a second voltage output at said third AC output; and
   wherein said switch has a first position in which said first and second AC outputs are coupled in parallel and said third AC output is shorted, to thereby provide a first voltage signal to either of said first and second outputs while disabling said third AC output; and wherein said switch has a second position in which said first and second AC outputs are uncoupled from one another and said third AC output is enabled, and wherein said controller controls said inverters such that said first and second AC outputs are out of phase, to thereby generate a second voltage signal at said third AC output which is greater than said first voltage signal.

6. The apparatus of claim 5, wherein said AC outputs of said first and second inverters are controlled by said controller to be 180 degrees out of phase when said switch is in said second position.

7. The apparatus of claim 5, further comprising a user controlled switch in communication with said controller for allowing a user to select whether said third AC output is operable or not.

8. The apparatus of claim 5, wherein each of said generators comprises a permanent magnet generator.

9. The apparatus of claim 5, wherein each of said inverters comprises an H-bridge inverter.

10. A synchronous alternator/inverter apparatus, comprising:

a first three phase generator;

a first inverter responsive to an output of said first three phase generator and having a first output terminal and a second output terminal cooperatively forming a first AC output;

a second three phase generator;

a second inverter responsive to an output of said second three phase generator and having a third output terminal and a fourth output terminal cooperatively forming a second AC output;

a third AC output formed between said first and fourth output terminals;

a switch for selectively enabling and disabling said third AC output;

a controller for controlling actuation of said switch between a first position and a second position, and operation of each of said inverters;

when said switch is placed in said first position said first and second AC outputs are placed in parallel while shorting said third AC output, and said controller controls said inverters such said first and second AC outputs are in phase, to thereby provide a first voltage output signal to each of said AC outputs, and wherein a first power level signal can be delivered to either of said first and second AC outputs; and when said switch is placed in said second position, said first and second AC outputs are uncoupled and third AC output is enabled, and said controller controls said inverters such that said first AC output is out of phase with said second AC output, thereby providing a second voltage output signal at said third AC output which is double that of said first voltage output signal.

11. The apparatus of claim 10, wherein when said switch is placed in said second position, a second power level signal is provided to each of said first and second AC outputs which is one half that of said first power level signal.

12. The apparatus of claim 10, wherein each said inverter comprises a full wave rectifier circuit.

13. The apparatus of claim 10, wherein said first inverter comprises an H-bridge inverter.

14. The apparatus of claim 10, wherein said second inverter comprises an H-bridge inverter.

15. The apparatus of claim 10, wherein each of said first and second inverters comprises an H-bridge inverter including a plurality of power switching devices.

16. The apparatus of claim 15, wherein each of said power switching devices comprises an insulated gate bipolar transistor.

17. The apparatus of claim 10, wherein each of said three phase generators comprises a permanent magnet generator.

18. A synchronous alternator/inverter apparatus, comprising:

a first permanent magnet generator (PMG);

a first rectifier for rectifying an output of said first PMG;

a first inverter responsive to an output of said first rectifier, and having a first output terminal and a second output terminal for cooperatively providing a first AC output;

a second PMG;

a second rectifier for rectifying an output of said second PMG;

a second inverter responsive to an output of said second rectifier, and having a third output terminal and a fourth output terminal cooperatively providing a second AC output;

a third AC output formed between said first and fourth output terminals;

an electronically controlled switch for selectively enabling and disabling said third AC output terminal;

a controller for controlling actuation of said switch between a first position and a second position, and controlling operation of each of said inverters;

when said switch is placed in said first position, said first and second AC outputs are coupled together in parallel while shorting said third AC output, and said controller controls said inverters such said first and second AC outputs are in phase, to thereby provide a first voltage output signal to each of said AC outputs, and wherein a first power level signal can be delivered to either of said AC outputs; and when said switch is placed in said second position, said first and second AC outputs are uncoupled and said third AC output is enabled, and said controller controls said inverters such that said first AC output is out of phase with said second AC output, thereby providing a second voltage output signal at said third AC output which is double that of said first voltage output signal while providing a second power level signal to each of said first and second AC outputs which is one half that of said first power level signal.

19. The apparatus of claim 18, wherein at least one of said rectifiers comprises a full wave bridge rectifier.

20. The apparatus of claim 18, wherein at least one of said inverters comprises an H-bridge inverter.

21. The apparatus of claim 18, wherein at least one of said inverters comprises an H-bridge inverter including four insulated gate bipolar transistors.

22. The apparatus of claim 18, wherein when said switch is in said second position, said controller controls said inverters such that said first and second AC outputs generate voltage outputs which are 180 degrees out of phase.

* * * * *